US010671513B2

(12) United States Patent
McCauley et al.

(10) Patent No.: US 10,671,513 B2
(45) Date of Patent: Jun. 2, 2020

(54) SYSTEM AND METHOD OF CAPTURING SYSTEM CONFIGURATION DATA TO RESOLVE AN APPLICATION MALFUNCTION (71) Applicant: WALGREEN CO., Deerfield, IL (US)

(72) Inventors: Timothy P. McCauley, Evanston, IL (US); Adam Ryan San Miguel, Lake Forest, IL (US)

(73) Assignee: WALGREEN CO., Deerfield, IL (US)

( * ) Notice: Subject to any disclaimer, the term of this patent is extended or adjusted under 35 U.S.C. 154(b) by 176 days.

(21) Appl. No.: 16/004,707

(22) Filed: Jun. 11, 2018

(65) Prior Publication Data
US 2019/0377657 A1  Dec. 12, 2019

(51) Int. Cl.
*G06F 11/00* (2006.01)
*G06F 11/36* (2006.01)
*G06F 11/07* (2006.01)
G06F 3/0484 (2013.01)

(52) U.S. Cl.
CPC ........ *G06F 11/366* (2013.01); *G06F 11/0721* (2013.01); *G06F 11/0778* (2013.01); *G06F 11/0784* (2013.01); *G06F 11/3644* (2013.01); *G06F 11/3672* (2013.01); *G06F 3/0484* (2013.01)

(58) Field of Classification Search
CPC ............. G06F 11/3072; G06F 11/0778; G06F 11/0784; G06F 11/366; G06F 11/3672
See application file for complete search history.

(56) References Cited

U.S. PATENT DOCUMENTS

2004/0153776 A1    8/2004  Rhea et al.
2010/0197238 A1*   8/2010  Pathuri ............... H04L 41/0609
                                                          455/67.11
2014/0122688 A1    5/2014  Partida
(Continued)

FOREIGN PATENT DOCUMENTS

EP        2770433 A1      8/2014
WO   WO-2015/073046 A1   5/2015

OTHER PUBLICATIONS

European Patent Application No. 19178744.9, Extended European Search Report, dated Oct. 8, 2019.

*Primary Examiner* — Charles Ehne
(74) *Attorney, Agent, or Firm* — Marshall, Gerstein & Borun LLP (57) ABSTRACT

Systems and methods for tracking mobile device software errors are disclosed. A mobile device, in response to receiving an indication of shaking, may capture error diagnostic information including, for instance, a screen shot, user information, and/or a session log. The mobile device may generate an error report including the error diagnostic information, and may submit the error report to a server after a user authorizes the submission. The mobile device may further subscribe the user to error report tracking, which may include periodically receiving and displaying progress status updates for a software error indicated by the error report. The progress status update may indicate that, for instance, the software error has previously been reported by a second user, that a solution for the software error is pending, or that a solution for the software error has been found.

20 Claims, 4 Drawing Sheets (56) References Cited

U.S. PATENT DOCUMENTS

| | | | |
|---|---|---|---|
| 2015/0379262 A1* | 12/2015 | Islam | G06F 21/51 |
| | | | 726/22 |
| 2016/0283356 A1* | 9/2016 | Waldman | G06F 11/3672 |
| 2017/0337098 A1 | 11/2017 | Lu | |

* cited by examiner

Software Error Database 400

| Error number | Error type ID | Error status | Error solution ID number | Error report date/time | Last error progress update | Store ID | User email address |
|---|---|---|---|---|---|---|---|
| 001 | 016 | Solution pending | N/A | 10/15/2016; 2:01 pm | 1/5/17; 9:00 am | 023 | alice@company.com |
| 002 | 023 | Solution found | 057 | 11/1/2016; 9:34 am | 1/5/17; 9:30 am | 208 | bob@company.com |
| 003 | 008 | Solution pending | N/A | 11/3/2016; 11:40 am | 1/5/17; 8:53 am | 015 | cindy@company.com |
| 004 | 016 | Previously reported as error 001; solution pending | N/A | 11/17/2016; 3:38 pm | 1/5/17; 10:00 am | 163 | dave@company.com |
| 005 | 023 | Previously reported as error 002; solution found | 057 | 12/2/2016; 4:15 pm | 1/5/17; 8:30 am | 092 | ellen@company.com |

SYSTEM AND METHOD OF CAPTURING SYSTEM CONFIGURATION DATA TO RESOLVE AN APPLICATION MALFUNCTION

TECHNICAL FIELD

The present disclosure relates to technology for tracking mobile device software errors.

BACKGROUND

When a software error occurs in a mobile device, it may be helpful for the mobile device user to report the error so that the software may be debugged, or so that the error may be otherwise corrected for future users. While there are some means for mobile device users to report software errors, these means are often inconvenient and time consuming, providing little incentive for a user to report such an error. Moreover, a mobile device user who reports a software error may be left unaware of an existing or pending solution for the error.

SUMMARY

A computer-implemented method for tracking mobile device software errors is provided. The method may include receiving, by a mobile device, an indication of a shaking motion of the mobile device, and in response to the indication of the motion, capturing error diagnostic information by the mobile device, including an image displayed on a screen of the mobile device at a time when the indication of the motion was received, information pertaining to a user of the mobile device, or a log of a session of the mobile device preceding the time when the indication of the motion was received. The method may additionally include generating an error report including the error diagnostic information, prompting a user to authorize a submission of the error report by the mobile device to a server, and in response to an authorization by the user, submitting the error report to the server via a network. The method may further include subscribing the user to a tracking of the error report, which may include receiving, by the mobile device, a progress status of a software error indicated by the error report from the server. The progress status may be an indication that, for instance, the software error has previously been reported by a second user, a solution for the software error is pending, or the solution for the software error has been found. The method may additionally include providing an indication to the user of the progress status via a user interface of the mobile device.

In another aspect, a mobile device configured to track mobile device software errors is provided. The mobile device may include a transceiver configured to communicate data via a network connection, a sensor configured to detect a motion of the mobile device indicating shaking, a memory configured to store non-transitory computer executable instructions, and a processor configured to interface with the transceiver and the memory, and configured to execute the non-transitory computer executable instructions. The instructions may cause the processor to receive, from the sensor, an indication of the motion of the mobile device indicating shaking, and capture, in response to the indication of the motion, error diagnostic information including, for instance, an image displayed on a screen of the mobile device at a time when the indication of the motion was received, information pertaining to a user of the mobile device, and/or a log of a session of the mobile device preceding the time when the indication of the motion was received. The instructions may further cause the processor to generate an error report including the error diagnostic information, prompt a user to authorize a submission of the error report to a server, submit, in response to an authorization by the user, the error report to the server via the network connection, and subscribe the user to a tracking of the error report. The tracking may include instructions causing the processor to receive a progress status of a software error indicated by the error report from the server via the network. The progress status may be, for instance, an indication that the software error has previously been reported by a second user, an indication that a solution for the software error is pending, and/or an indication that the solution for the software error has been found. The instructions may further include instructions to provide an indication to the user of the progress status.

In another aspect, a computer-readable storage medium having stored thereon a set of instructions, executable by a processor, for tracking mobile device software errors, is provided. The stored instructions may include instructions for receiving an indication of a motion of a mobile device indicating a shaking of the mobile device, and instructions for capturing, in response to the indication of the motion, error diagnostic information, including, for instance, an image displayed on a screen of the mobile device at a time when the indication of the motion was received, information pertaining to a user of the mobile device, and/or a log of a session of the mobile device preceding the time when the indication of the motion was received. The stored instructions may further include instructions for generating an error report including the error diagnostic information, instructions for prompting a user to authorize a submission of the error report to a server, instructions for submitting, in response to an authorization by the user, the error report to the server via a network, and instructions for subscribing the user to a tracking of the error report. The tracking may include instructions for receiving a progress status of a software error indicated by the error report, from the server via the network. The progress status may be, for instance that the software error has previously been reported by a second user, a solution for the software error is pending, and/or the solution for the software error has been found. The tracking may additionally include instructions for providing, via a user interface, an indication to the user of the progress status.

DETAILED DESCRIPTION

In embodiments described below, a mobile device generates a software error report and subscribes a user to a tracking of a software error indicated by the report in response to a user shaking the mobile device. The error tracking subscription may include periodic updates on the status of the software error, e.g., whether the error has been previously reported by other users, whether a solution for the error is pending, and whether a solution has been found.

Figure 1:
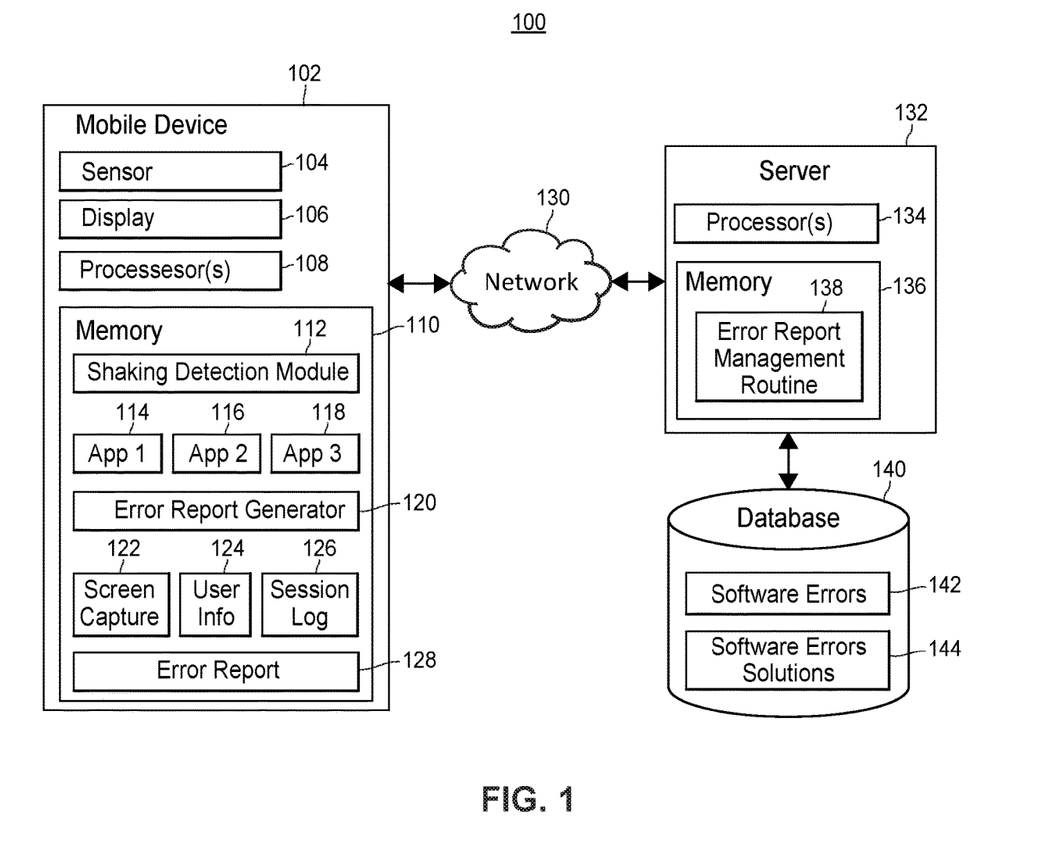
FIG. 1 depicts an exemplary system for tracking mobile device software errors.

FIG. 1 depicts an exemplary system 100 for tracking mobile device software errors. The system 100 may include a mobile device 102, a network 103, a server 132, and a database 140. The mobile device 102 may include a sensor 104, a display 106, a processor 108, and a memory 110. The sensor 104 may be an accelerometer, gyroscope, motion detector, or any other kind of sensor.

The processor 108 may include multiple processors 108. The memory 110 may be a computer-readable, non-transitory storage unit or device, or collection of units/devices, and may include persistent (e.g., hard disk) and/or non-persistent memory components. The memory 110 may store instructions that are executable on the one or more processors to perform various operations, including the instructions of various software applications and data generated and/or used by such applications. The memory 110 may include instructions for executing a shaking detection module 112, one or more applications 114, 116, 118, and an error report generator 120. The memory may include instructions for initializing an error report generator 120 as a library for various applications 114, 116, 118 capable of running on the mobile device. The memory 110 may store or may include instructions for storing a screen capture 122, a user information 124, a session log 126, and an error report 128.

The sensor 104 may detect a motion of the mobile device 102. The motion of the mobile device 102 may be a shaking of the device. In some embodiments, the motion of the mobile device 102 may be a horizontal movement of the mobile device 102, a vertical motion of the mobile device 102, a spinning or other rotation of the mobile device 102, or any other motion of the mobile device 102. In some embodiments, the sensor 104 may additionally or alternatively detect a tapping of the mobile device 102, or the pressing of one or more buttons of the mobile device 102.

The shaking detection module 112 may receive an indication from the sensor 104 that a shaking motion of the mobile device 102 has been detected. In other embodiments, the shaking detection module may be a motion detection module, or tapping detection module, or some other detection module configured to receive indications from a sensor such as sensor 104. The memory 110 may then execute instructions to capture and store a screen capture 122, user information 124, and/or a session log 126. The screen capture 122 may include an image of the display 102 at the time of the shaking detection. The user information 124 may include user identification, user contact information, retail store identification retail store department identification, mobile device identification, or any other information associated with the user of the mobile device 102 and/or the mobile device 102. The session log 126 may include a date and/or time of the shaking detection, an indication of one or more application(s) 114, 116, 118 running at the time of the shaking detection, and/or any other session log information from the time of the shaking detection or the time preceding the shaking detection.

The error report generator 120 may then generate an error report 128 using one or more of the screen capture 122, user information 124, and/or session log 126. The error report generator 102 may additionally request user input to include in the error report 128. The user input may be requested from a user of the mobile device 102 via a user interface displayed on the display 106. The user input may include a description by the user of a software error experienced prior to the shaking of the device. The user input may be in the form of a free response, or it may be in the form of a multiple choice or drop down questionnaire or other survey.

The mobile device 102 may transmit the error report, via a wired or wireless network 130, to a server 132. The server 132 may include a processor 134 and a memory 136. The processor 134 may include multiple processors 134. The memory may 136 be a computer-readable, non-transitory storage unit or device, or collection of units/devices, and may include persistent (e.g., hard disk) and/or non-persistent memory components. The memory 110 may store instructions that are executable on the one or more processors to perform various operations, including the instructions of various software applications and data generated and/or used by such applications. The memory 136 may include instructions for executing an error report management routine 138.

The processor 134 may execute an error report management routine 138. The error report management routine 138 may include receiving the error report 128 from the network 130. The error report management routine 138 may determine an error indicated by the error report 128. The error report management routine 138 may access a software error database 140. The database 140 may include software error data 142 and software error solutions 144. The software error data 142 may include previous software error reports and status indications for those previous software error reports. The previous software error reports may originate from other users. Status indications may include a status that an error has been previously reported, that a solution is pending, or that a solution has been found for the error. The software error data 142 may further include an error identification for each error report. Errors with the same error identification may be solved using the same or similar solutions.

The error report management routine 138 may determine whether the error indicated by the error report 128 has been previously reported and stored in the software error data 142. If the error has not been previously reported and stored in the software error data 142, the error report management routine 138 may add the information from the error report 128 to the software error data 142. The error report management routine 138 may determine an error progress status indication for the error identification indicated by the error report 128. The server 132 may then transmit a software error progress status for the error indicated by the error report 128 to the mobile device 102 via the network 130.

If the error progress status indicates that the error indicated by the error report 128 has been previously reported and/or a solution is pending, the error report management routine 138 may access the database 140 at periodic time intervals in order to determine if the error progress status has changed. The time interval may be pre-set, or it may be set by a user. If the error progress status has changed, the error report management routine 138 may include instructions for the server to transmit the updated error progress status to the mobile device 102 via the server 130.

If the error progress status indicates that a solution has been found for the error indicated by the error report 128, the error report management routine may additionally or alternatively access the software error solutions 144 stored in the database 140. The software error solutions 144 may include solutions for various error identifications. A solution may be step-by-step instructions for fixing an error, a software update that may fix the error, or any other type of software solution format. The error report management routine may locate, within the software error solutions 144, a solution for the error indicated by the error report 128. The server 132 may then transmit, via the network 130, the solution from the software error solutions 144 to the mobile device 102.

The mobile device 102, after receiving the software error status, updated software error status, or software error solution, may display an indication on the display 106 via a user interface. The mobile device 102 may additionally or alternatively display or implement the software error solution.

Figure 2:
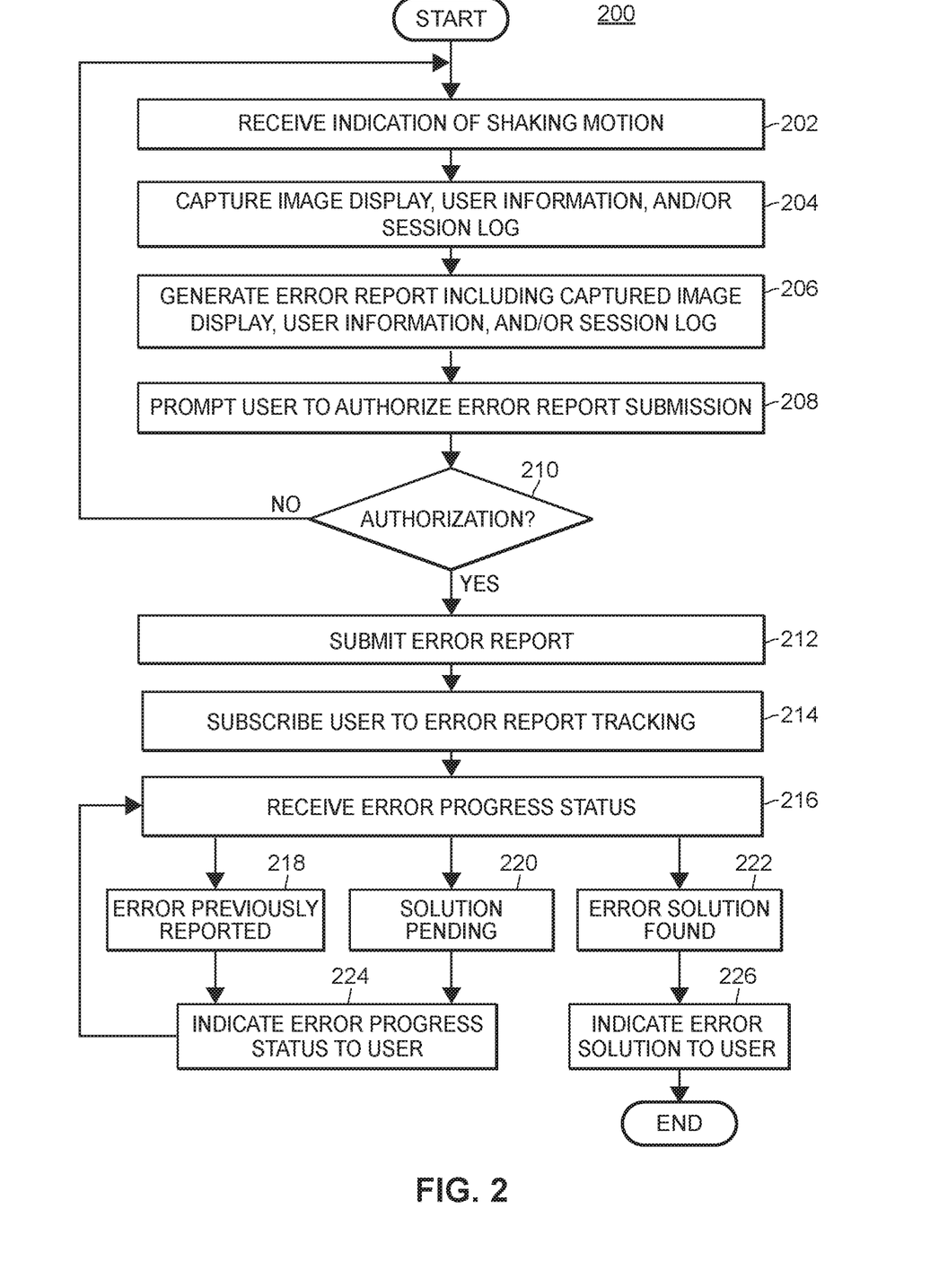
FIG. 2 depicts an exemplary flow diagram of a method for tracking mobile device software errors, from mobile device perspective.

FIG. 2 depicts a flow diagram of an exemplary method 200 for tracking mobile device software errors, as implemented by a mobile device such as mobile device 102 discussed with respect to FIG. 1. The method 200 may begin when the mobile device, via a shaking detection module, such as shaking detection module 112, receives an indication of a shaking motion (block 202). The shaking motion may occur as a result of a user purposefully shaking the mobile device after encountering a software error.

The mobile device may next capture a screen shot of an image display of the mobile device, user information, and/or a session log (block 204). The image display may depict the mobile device display screen at the time of the indication of shaking and/or at the time of the occurrence of the software error. The user information may relate to contact information associated with the user, a store location associated with the user, a store department associated with the user and any other user information recorded by the mobile device. The session log may include the date and time of the indication of shaking, the applications, such as applications 114, 116, 118 running on the mobile device at the time of the shaking, a log of user and/or device actions in a time period preceding the shaking, and any other session log information captured by the mobile device.

The mobile device may next generate an error report including the captured image display, user information, and/or session log (block 206). The error report may be generated by an error report generator such as error report generator 120 discussed with respect to FIG. 1. The error report may additionally include any other useful error diagnostic information, including input from a user, such as a description of the error encountered by the user.

The mobile device may next prompt (block 208) a user to authorize the submission of the error report generated at block 206. The mobile device may prompt the user via a user interface shown on a mobile device display, such as display 106. The user may have the option to select "YES" or "NO" when asked to authorize the submission of the error report (block 210). The user may choose "NO", for instance, if the user did not shake the mobile device, or if the user shook the mobile device accidentally without the intention to submit an error report. If the user selects "NO," then no error report will be submitted.

If the user selects "YES," the mobile device may next submit the error report generated at block 206 to a server, such as server 132 discussed with respect to FIG. 1 (block 212). The mobile device may submit the error report to the server via a wired or wireless network, such as network 130 discussed with respect to FIG. 1.

The mobile device may next subscribe the user to error report tracking (block 214). The mobile device of the user subscribed to error report tracking may periodically receive updates from the server regarding the status of the error report submitted at block 212 (block 216). For instance, the mobile device may receive an error progress status indicating that an error indicated by the submitted error report has been previously reported by another user (block 218). The "previously reported" status may indicate that technical support specialists are aware of an error indicated by the submitted error report. The mobile device may additionally or alternatively receive an error progress status indicating that a solution for an error indicated by the submitted error report is pending (block 220). The "pending" status may indicate that technical support specialists are aware of the error and are currently working to identify a solution for the error. Of course, other embodiments may include additional or alternative error report statuses not shown in FIG. 2. The mobile device may next indicate the error progress status to the user (block 224). The error progress status may be indicated to the user via a display of the mobile device such as display 106, and/or via a user interface of the mobile device. The mobile device may next receive an additional error progress status if and/or when the error progress status changes (block 216).

The mobile device may receive (block 216) an error progress status from the server indicating that an error solution has been found (block 222) for an error indicated in the submitted error report. When an error solution has been found, the mobile device may indication of the error solution. For example, the indication may be step-by-step instructions for how to fix the error, or the indication may be a software update received by the mobile device. The mobile device may next indicate the received solution to the user (block 226). Additionally or alternative, the mobile device may implement the solution for any affected applications, such as applications 114, 116, 118.

Figure 3:
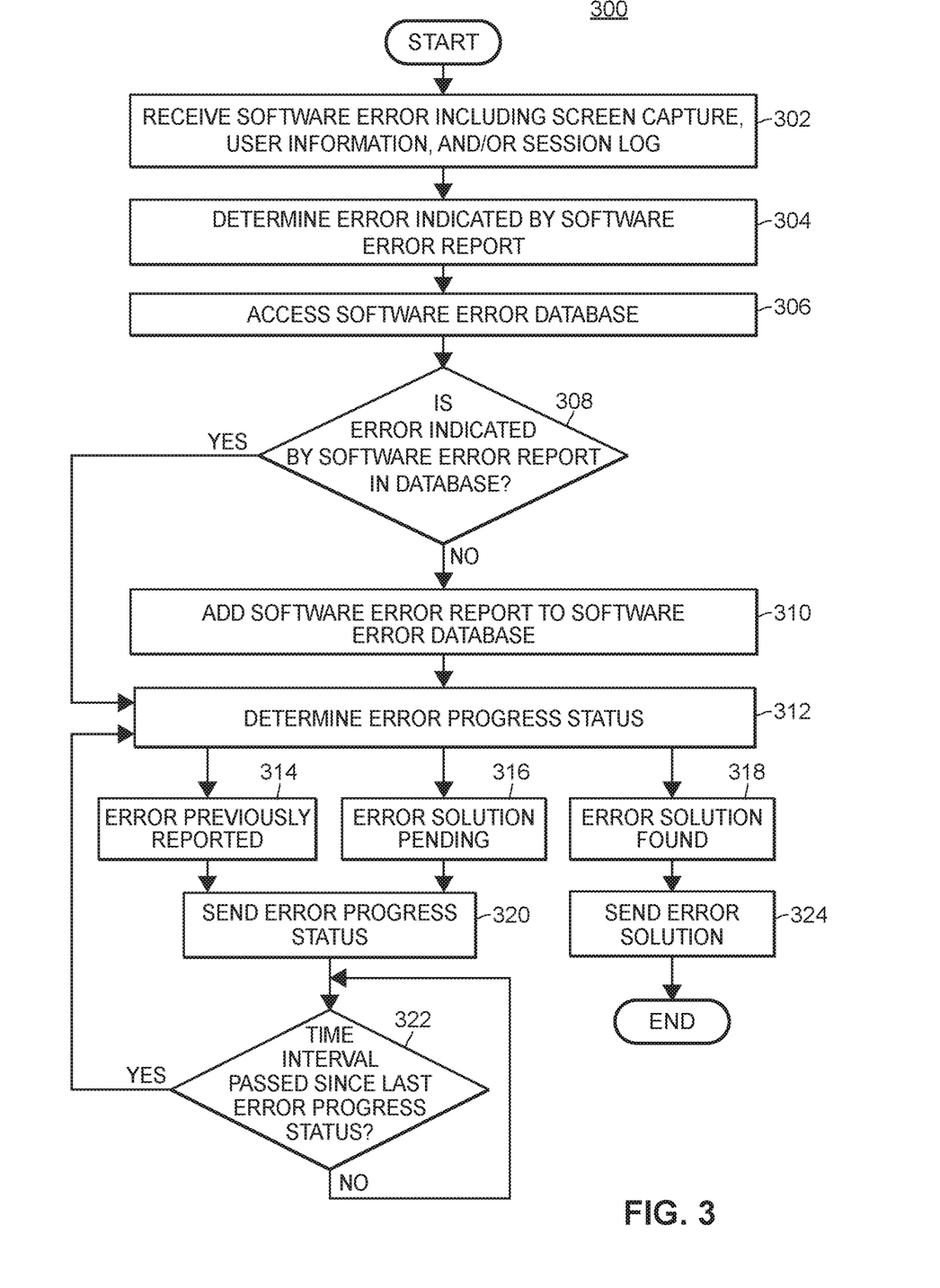
FIG. 3 depicts an exemplary flow diagram of a method for tracking mobile device software errors, from server perspective.

FIG. 3 depicts a flow diagram of an exemplary method 300 for tracking mobile device software errors, as implemented by a server, such as server 132 discussed with respect to FIG. 1. The method 300 may begin when the server receives a software error report including a screen capture, user information, and/or session log, such as the software error report 128 (block 302). The server may receive the software error report from a mobile device, such as mobile device 102. The software error report may be transmitted over a wireless or wired network such as network 130.

The server may next analyze the software error report to determine an error indicated by the report (block 304). The determination of the error may be based on the error diagnostic information such as the screen capture, user information, session log, and/or user input, or any other error diagnostic information included in the error report. The determination of the error may include generating an error ID number indicating the error.

The server may next access a software error database, such as database 140 (block 306). The database may contain software error data, such as software error data 142 and software error solutions, such as software error solutions 144. The software error database may include errors reported by other users and/or any other known errors. The server may next query (block 308) whether the error determined at block 304 has already been included in the software error database. The server may search the software error data to determine whether there are other listed errors with the same error ID number. If the error is not already in the software error database (block 308, NO), the server may add the software error report received at block 302 to the software error database (block 310).

Once the error has been added to the software database (or if it was already in the software error database [block 308, YES]), the server may next determine an error progress status (block 312). The server may determine an error progress status using the software error database. For each error ID, the software error database may indicate a status. For example, error progress statuses may include whether the error has been previously reported (block 314), an error solution is pending (block 318), or an error solution has been found (block 318). Of course, other embodiments, not shown in FIG. 3 may include additional or alternative error progress statuses.

If the error progress status is "previously reported" or "solution pending", the server may send the error progress status to a mobile device (block 320). The server may periodically re-check the software error database for updates regarding the status of the error. For instance, a time interval may be pre-set or set by a user, and if the time interval has passed since the last error progress status was sent for that error (block 322, YES), the server may again determine the error progress status (block 312). The server may then re-send the error progress status (block 320). In some embodiments, the server may re-send the error progress status only if the status has changed. If the time interval has not passed, the server may continue to re-check the time until the time interval has passed (block 322, NO).

If the error progress status is "solution found", the server may locate a solution in the software error database, such as in the software error solutions 144. The software error solutions 144 may list solutions for various software errors. The server may use an error ID to locate a solution in the database. The server may then send the software error solution to the mobile device (block 324).

Figure 4:
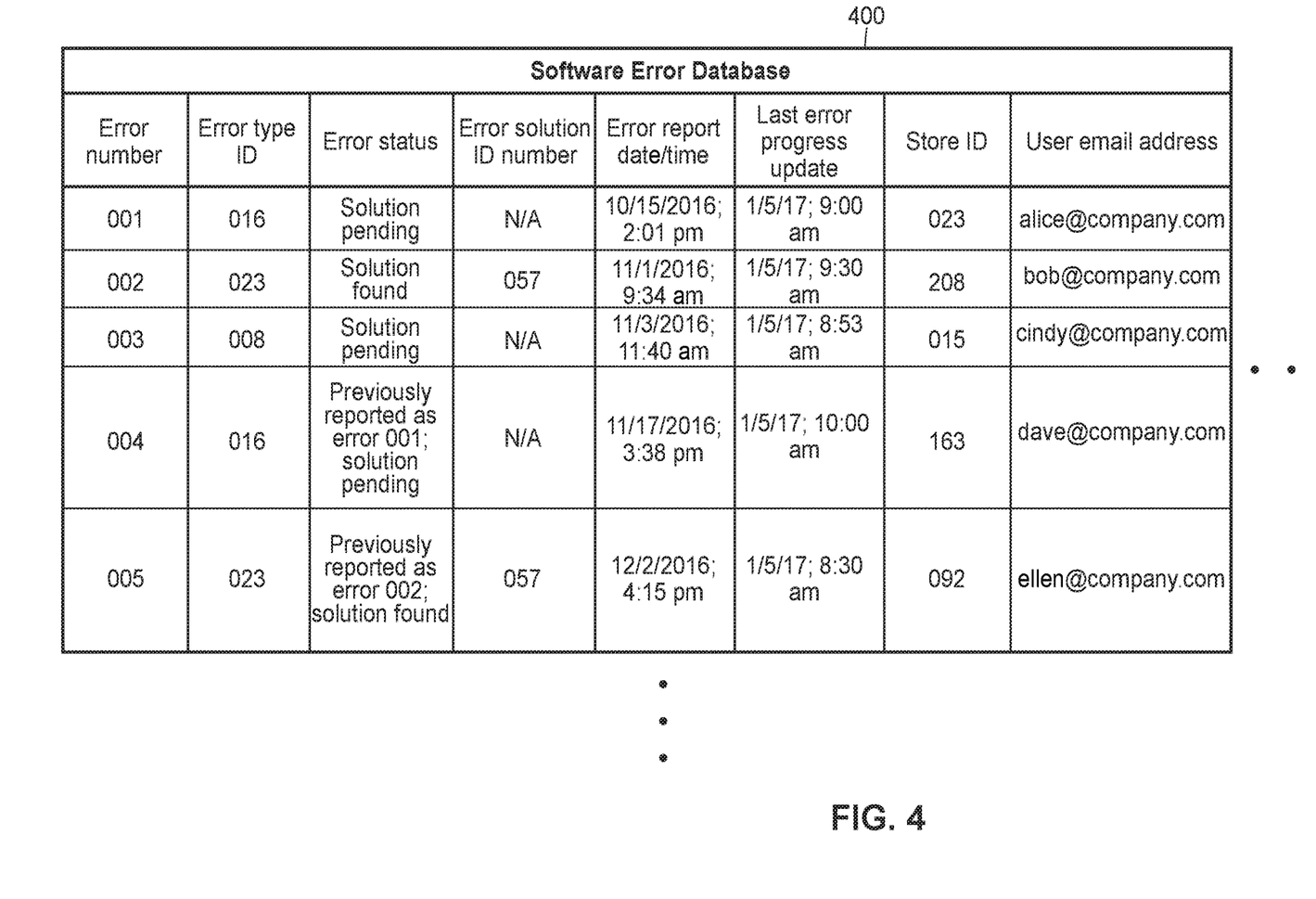
FIG. 4 depicts a database structure to be used for tracking mobile device software errors.

FIG. 4 depicts an exemplary database structure 400 for storing software errors. The database structure 400 may be implemented, for example, in a software error database 140 as discussed with respect to FIG. 1.

The database structure 400 may include an error report number. The error report number may correspond to a particular error report added to the database by a server, such as server 132, as discussed at block 310 of FIG. 3. The database structure 400 may additionally include an error type ID. The error type ID may indicate an error or a type of error found in a given error report. For instance, in the database structure 400, error report number 001 and 004 may both include error 016, while error report number 003 includes error type ID 008, for instance. The error type ID for a given error report may be determined by an analysis of the error diagnostic information in included in the error report.

The database structure 400 may include an error status. The error status may indicate that the error type ID has been previously reported. The error status may additionally indicate the error report number(s) associated with the previously reported error of the same type. For instance, the error status for error report number 004 indicates that the error type ID found in error report number 004 (error type ID 016) has previously been reported in error report 001. This information may be useful for technical support specialists looking to analyze multiple instances of the same error. The error report status may additionally or alternatively indicate that a solution is pending for the error type ID found in the error report. As discussed above, an error report status of "solution pending" may indicate that technical support specialists are working on a solution for the error type ID. For instance, error report number 003 has an error report status of "solution pending," indicating that technical support specialists may be working on a solution based on the error diagnostic information included in error report 003. If a solution for an error type ID has been found, the error status may indicate "solution found." For instance, as depicted in database structure 400, a solution has been found for error type ID 023 found in error report 002. The database structure 400 may include multiple error statuses for a given error report and/or a given error type. For instance, the error report status for error report number 005 with error type ID 023 indicates that the error type ID 023 has been previously reported in error report number 002, and that a solution has been found for error type ID 023.

If and/or when a solution is found for a given error type ID, the database structure 400 may include an error solution ID number. For instance, a solution has been found for error type ID 023 found in error report number 002, so an error solution ID number 057 is included for error report number 002. The error solution ID number may cross-reference to an error solution database indicating instructions or software updates for correcting a given error. Additionally or alternatively, rather than indicating an error solution ID number, the software error database structure 400 may include an indication of instructions or software updates for correcting a given error.

The software error database structure 400 may include a date and/or time of the error report. The date and/or time may be the date and/or time of the indication of shaking 202 discussed with respect to FIG. 2. The software error database structure 400 may also include a date/time of the last error progress update sent by the server. This indication may be useful for a determination of when the server must send a fresh update.

The software error database structure 400 may include user information from each error report, such as a store ID and user contact information, such as a user e-mail address. The software error database structure may further include any other error diagnostic information, user input, or any other information included in any error report.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A method for tracking mobile device software errors, the method comprising:

receiving, by a mobile device, an indication of a motion of the mobile device, wherein the motion of the mobile device indicates a shaking of the mobile device;

capturing, by the mobile device, in response to the indication of the motion, at least one of the following error diagnostic information:

an image displayed on a screen of the mobile device at a time when the indication of the motion was received, an information pertaining to a user of the mobile device, or a log of a session of the mobile device preceding the time when the indication of the motion was received;

generating, by the mobile device, an error report including the at least one error diagnostic information;

prompting a user, by the mobile device, to authorize a submission of the error report to a server;

submitting, by the mobile device, in response to an authorization by the user, the error report to the server via a network;

subscribing, by the mobile device, the user to a tracking of the error report, wherein the tracking comprises:

receiving, by the mobile device, a progress status of a software error indicated by the error report, from the server via the network, wherein the progress status is an indication of at least one of:

the software error has previously been reported by a second user, a solution for the software error is pending, or the solution for the software error has been found; and providing, by the mobile device, via a user interface of the mobile device, an indication to the user of the progress status.

2. The method of claim 1, wherein tracking further comprises:

receiving, by the mobile device, in response to receiving the progress status indication that the solution for the software error has been found, an indication of the solution for the software error; and providing, by the mobile device, via the user interface of the mobile device, an indication to the user of the solution for the software error.

3. The method of claim 2, further comprising:

classifying, using the error diagnostic information, a type of the software error indicated by the error report; and wherein receiving an indication of the solution for the software error further comprises receiving an indication of a solution for the type of the software error.

4. The method of claim 1, wherein tracking further comprises:

receiving, by the mobile device, after receiving the progress status indication that the software error has previously been reported by a second user or that the solution for the software error is pending, an additional progress status indication after a set time interval; and providing, by the mobile device, via the user interface of the mobile device, an indication of the additional progress status.

5. The method of claim 1, further comprising:

prompting a user, by the mobile device, in response to the indication of the motion, to enter a description of a mobile device software error experienced by the user preceding the indication of motion; and wherein the error report including the at least one error diagnostic information further includes the description of the mobile device software error experienced by the user.

6. The method of claim 1, wherein the error diagnostic information further includes one or more of:

a time of the indication of motion, a date of the indication of motion, an identification of a retail store associated with at least one of the mobile device or a user of the mobile device, or an identification of a retail store department associated with at least one of the mobile device or a user of the mobile device.

7. The method of claim 1, wherein the method further comprises initializing, by the mobile device, a library using one or more parameters for one or more applications.

8. A mobile device configured to track mobile device software errors, comprising:

a transceiver configured to communicate data via at least one network connection;

a sensor configured to detect a motion of the mobile device indicating shaking;

a memory configured to store non-transitory computer executable instructions; and a processor configured to interface with the transceiver and the memory, and configured to execute the non-transitory computer executable instructions to cause the processor to:

receive, from the sensor, an indication of the motion of the mobile device indicating shaking capture, in response to the indication of the motion, at least one of the following error diagnostic information:

an image displayed on a screen of the mobile device at a time when the indication of the motion was received, an information pertaining to a user of the mobile device, or a log of a session of the mobile device preceding the time when the indication of the motion was received;

generate an error report including the at least one error diagnostic information;

prompt a user to authorize a submission of the error report to a server;

submit, in response to an authorization by the user, the error report to the server via the at least one network connection; and subscribe the user to a tracking of the error report, wherein the tracking includes instructions to cause the processor to:

receive a progress status of a software error indicated by the error report, from the server via the network, wherein the progress status is an indication of at least one of:

the software error has previously been reported by a second user, a solution for the software error is pending, or the solution for the software error has been found; and provide, via a user interface, an indication to the user of the progress status.

9. The mobile device of claim 8, wherein the tracking further includes instructions to cause the processor to:

receive, in response to receiving the progress status indication that the solution for the software error has been found, an indication of the solution for the software error; and provide, via the user interface, an indication to the user of the solution for the software error.

10. The mobile device of claim 9, wherein the instructions further cause the processor to:

classify, using the error diagnostic information, a type of the software error indicated by the error report; and wherein the instructions causing the processor to receive an indication of the solution for the software error further include instructions to receive an indication of a solution for the type of the software error.

11. The mobile device of claim 8, wherein tracking further includes instructions to cause the processor to:

receive, after receiving the progress status indication that the software error has previously been reported by a second user or that the solution for the software error is pending, an additional progress status indication after a set time interval; and provide, via the user interface, an indication of the additional progress status.

12. The mobile device of claim 8, wherein the instructions further cause the processor to:

prompt a user, in response to the indication of the motion, to enter a description of a mobile device software error experienced by the user preceding the indication of motion; and wherein the error report including the at least one error diagnostic information further includes the description of the mobile device software error experienced by the user.

13. The mobile device of claim 8, wherein the error diagnostic information further includes one or more of:

a time of the indication of motion, a date of the indication of motion, an identification of a retail store associated with at least one of the mobile device or a user of the mobile device, or an identification of a retail store department associated with at least one of the mobile device or a user of the mobile device.

14. The mobile device of claim 8, wherein the instructions further cause the processor to initialize a library using one or more parameters for one or more applications.

15. A computer-readable storage medium having stored thereon a set of instructions, executable by a processor, for tracking mobile device software errors, the instructions comprising:

instructions for receiving an indication of a motion of a mobile device, wherein the motion of the mobile device indicates a shaking of the mobile device;

instructions for capturing, in response to the indication of the motion, at least one of the following error diagnostic information:

an image displayed on a screen of the mobile device at a time when the indication of the motion was received, an information pertaining to a user of the mobile device, or a log of a session of the mobile device preceding the time when the indication of the motion was received;

instructions for generating an error report including the at least one error diagnostic information;

instructions for prompting a user to authorize a submission of the error report to a server;

instructions for submitting, in response to an authorization by the user, the error report to the server via a network;

instructions for subscribing the user to a tracking of the error report, wherein the tracking comprises:

instructions for receiving a progress status of a software error indicated by the error report, from the server via the network, wherein the progress status is an indication of at least one of:

the software error has previously been reported by a second user, a solution for the software error is pending, or the solution for the software error has been found; and instructions for providing, via a user interface, an indication to the user of the progress status.

16. The computer-readable storage medium of claim 15, wherein the tracking further comprises:

instructions for receiving, in response to receiving the progress status indication that the solution for the software error has been found, an indication of the solution for the software error; and instructions for providing, via the user interface of the mobile device, an indication to the user of the solution for the software error.

17. The computer-readable storage medium of claim 16, the instructions further comprising:

instructions for classifying, using the error diagnostic information, a type of the software error indicated by the error report; and wherein the instructions for receiving an indication of the solution for the software error further comprise instructions for receiving an indication of a solution for the type of the software error.

18. The computer-readable storage medium of claim 15, wherein the tracking further comprises:

instructions for receiving, after receiving the progress status indication that the software error has previously been reported by a second user or that the solution for the software error is pending, an additional progress status indication after a set time interval; and instructions for providing, via the user interface, an indication of the additional progress status.

19. The computer-readable storage medium of claim 15, the instructions further comprising:

instructions for prompting a user, by the mobile device, in response to the indication of the motion, to enter a description of a mobile device software error experienced by the user preceding the indication of motion; and wherein the error report including the at least one error diagnostic information further includes the description of the mobile device software error experienced by the user.

20. The computer-readable storage medium of claim 15, wherein the error diagnostic information further includes one or more of:

a time of the indication of motion, a date of the indication of motion, an identification of a retail store associated with at least one of the mobile device or a user of the mobile device, or an identification of a retail store department associated with at least one of the mobile device or a user of the mobile device.

* * * * *